(12) United States Patent
Wycoff et al.

(10) Patent No.: US 12,480,006 B2
(45) Date of Patent: Nov. 25, 2025

(54) SOLUBILIZED AVOBENZONE FUSING AGENTS

(71) Applicant: PERIDOT PRINT LLC, Palo Alto, CA (US)

(72) Inventors: Kyle Wycoff, Palo Alto, CA (US); Adekunle Olubummo, Palo Alto, CA (US); Aja Hartman, Palo Alto, CA (US); Michelle Niu, Palo Alto, CA (US); Krzysztof Nauka, Palo Alto, CA (US); Emily Levin, San Diego, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 114 days.

(21) Appl. No.: 18/683,211

(22) PCT Filed: Aug. 20, 2021

(86) PCT No.: PCT/US2021/046803
§ 371 (c)(1),
(2) Date: Feb. 12, 2024

(87) PCT Pub. No.: WO2023/022725
PCT Pub. Date: Feb. 23, 2023

(65) Prior Publication Data
US 2025/0136830 A1     May 1, 2025

(51) Int. Cl.
*C09D 7/63* (2018.01)
*B29C 64/165* (2017.01)
(Continued)

(52) U.S. Cl.
CPC .............. *C09D 7/63* (2018.01); *B29C 64/165* (2017.08); *B33Y 10/00* (2014.12); *B33Y 70/10* (2020.01); *C09D 7/20* (2018.01); *C09D 7/45* (2018.01); *C09D 177/04* (2013.01); *B29K 2077/00* (2013.01); *B29K 2105/0032* (2013.01); *B29K 2105/005* (2013.01); *B29K 2995/002* (2013.01); *B29K 2995/0094* (2013.01); *C08K 5/07* (2013.01)

(58) Field of Classification Search
CPC ....... B29C 64/165; B33Y 70/10; B33Y 10/00; B29K 2105/005; B29K 2995/002; B29K 2995/0094; C08K 5/07
See application file for complete search history.

(56) References Cited

U.S. PATENT DOCUMENTS 9,765,226 B2    9/2017  Dain
12,104,018 B2 * 10/2024  Pollino .................. B33Y 70/00
(Continued)

FOREIGN PATENT DOCUMENTS

CA        2915409 A1    12/2014
CN      112062878 A    12/2020
(Continued)

*Primary Examiner* — Nahida Sultana
(74) *Attorney, Agent, or Firm* — Dierker & Kavanaugh, P.C.

(57) ABSTRACT

A fusing agent for three-dimensional printing can include from about 5 wt % to about 40 wt % water; from about 4 wt % to about 60 wt % C7 to C12 aliphatic ester cosolvent; and from about 0.5 wt % to about 10 wt % solubilized avobenzone.

15 Claims, 2 Drawing Sheets

(51) Int. Cl.
  *B29K 77/00*   (2006.01)
  *B29K 105/00*  (2006.01)
  *B33Y 10/00*   (2015.01)
  *B33Y 70/10*   (2020.01)
  *C08K 5/07*    (2006.01)
  *C09D 7/20*    (2018.01)
  *C09D 7/45*    (2018.01)
  *C09D 177/04*  (2006.01)

(56) References Cited

U.S. PATENT DOCUMENTS

| | | |
|---|---|---|
| 2013/0201265 A1 | 8/2013 | Nishioka et al. |
| 2016/0198576 A1 | 7/2016 | Lewis et al. |
| 2019/0210355 A1 | 7/2019 | Dean et al. |
| 2021/0009408 A1 | 1/2021 | Woolley et al. |
| 2022/0416424 A1* | 12/2022 | Deore .................... B33Y 10/00 |
| 2023/0027920 A1* | 1/2023 | Pollino .............. C08G 73/1032 |
| 2023/0256670 A1* | 8/2023 | Schaffner .............. B29C 64/171 |
| | | 700/98 |
| 2025/0115778 A1* | 4/2025 | Thomas .................. C09D 7/65 |

FOREIGN PATENT DOCUMENTS

| | | |
|---|---|---|
| JP | 2013-177550 A | 9/2013 |
| WO | 2017/069778 A1 | 4/2017 |
| WO | 2020/251661 A1 | 12/2020 |
| WO | 2021/025696 A1 | 2/2021 |

* cited by examiner

SOLUBILIZED AVOBENZONE FUSING AGENTS

BACKGROUND

Methods of three-dimensional (3D) digital printing, a type of additive manufacturing, have continued to be developed over the last few decades. In general, three-dimensional printing technology can change the product development cycle by allowing rapid creation of prototype models or even finished products. For example, several commercial sectors such as aviation and the medical industry, to name a few, have benefitted from rapid prototyping and/or the production of customized parts. There are various methods for three-dimensional printing that have been developed, including heat-assisted extrusion, selective laser sintering, photolithography, additive manufacturing, as well as others. As technology advances, higher demands with respect to production speed, part consistency, variable mechanical properties, equipment reliability, coloration, etc., are becoming more in demand.

DETAILED DESCRIPTION

Figure 1:
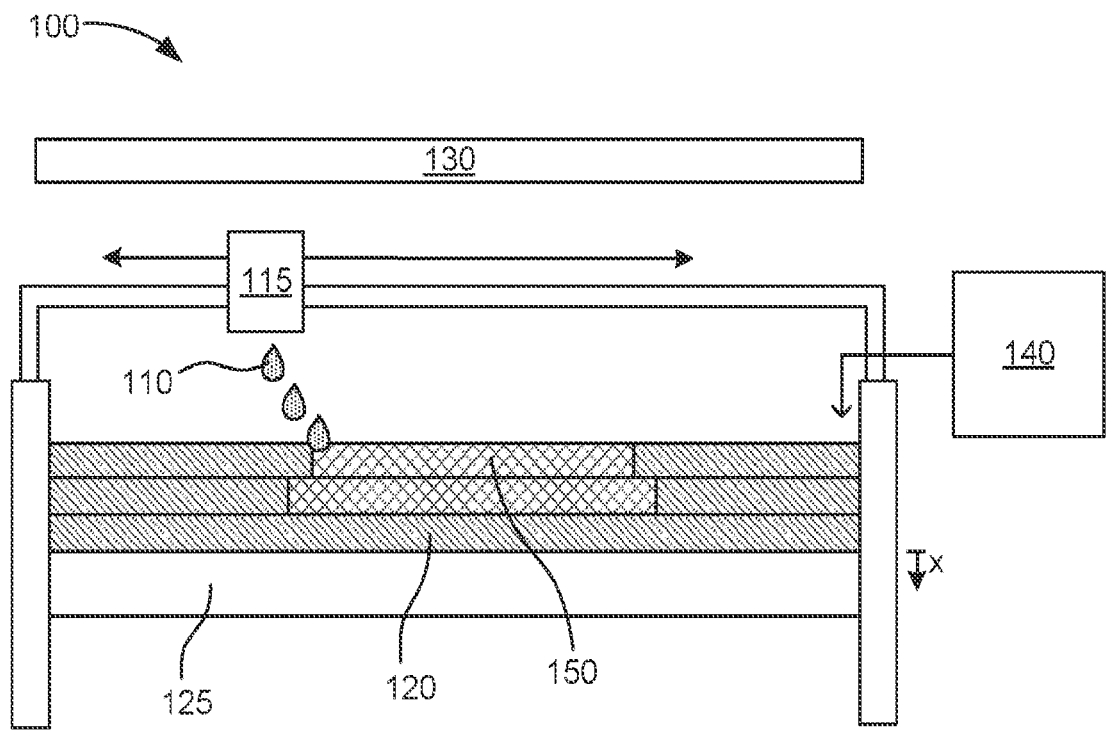
FIG. 1 schematically illustrates an example fusing agent, three-dimensional printing kit, and three-dimensional printing system in accordance with the present disclosure.

The present disclosure is drawn to three-dimensional (3D) printing, and includes fusing agents, three-dimensional printing kits, methods of making fusing agents, methods of three-dimensional printing, three-dimensional objects, and the like. For example, three-dimensional printing kits with the fusing agents described herein can be used with build material of polymeric particles that are spread on a powder bed on a layer-by-layer basis. The various layers can be selectively contacted with the fusing agent that includes a solubilized avobenzone radiation absorber. The fusing agent can be ejected from a print head, for example, and then the layer can be exposed to ultraviolet (UV) or violet electromagnetic radiation, e.g., about 345 nm to about 415 nm, to heat the layer of the build material. The radiation absorber can absorb the electromagnetic radiation and emit heat to the surrounding polymeric particles thereby fusing the adjacent polymeric particles to one another. This can be repeated layer-by-layer until a three-dimensional printed object (referred to herein as a "three-dimensional object) is formed.

It is noted that when discussing fusing agents, three-dimensional printing kits, methods of making fusing agents, methods of three-dimensional printing, or three-dimensional objects, such discussions can be considered applicable to the other examples, whether or not they are explicitly discussed in the context of that example. Thus, for example, in discussing a C7 to C12 aliphatic ester cosolvent related to the fusing agents, such disclosure is also relevant to and directly supported in context of the methods, kits, and objects, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Fusing Agents

Fusing agents of the present disclosure include from about 5 wt % to about 40 wt % water, from about 4 wt % to about 60 wt % C7 to C12 aliphatic ester cosolvent, and from about 0.5 wt % to about 10 wt % solubilized avobenzone. The solubilized avobenzone is included in the fusing agent as the radiation absorber or fusing compound. As mentioned, the avobenzone can be present in the fusing agent at from about 0.5 wt % to about 10 wt %, but in some alternative examples, the avobenzone can be included at from about 0.5 wt % to about 5 wt %, from about 1 wt % to about 4 wt %, or from about 1.5 wt % to about 7 wt %. Using avobenzone as the radiation absorber in the fusing agent can be useful for generating heat in response to exposure to UV or some violet wavelengths of electromagnetic energy. In some examples, the fusing agent can have a peak absorption from about 345 nm to about 415 nm. In some examples, the fusing agent can have a peak absorption from about 355 nm to about 405 nm, or from about 365 nm to about 395 nm. Within one or more of these ranges, the fusing agent can have an absorbance from about 0.2 to about 2, from about 0.2 to about 1, from about 0.4 to about 1, or from about 0.2 to about 0.8 at the peak absorption.

The C7 to C12 aliphatic ester cosolvent can be used to dissolve the avobenzone for formulation with other components of the fusing agent, e.g., water, other organic cosolvent, surfactant, etc. Example C7 to C12 aliphatic ester cosolvent that can be used in the fusing agent can include ethyl hexanoate, octyl acetate, ethyl octanoate, decyl acetate, and/or ethyl decanoate, to name a few. As a note, regarding the ethyl haxanoate, for purposes of the present disclosure, this is considered to be a C7 aliphatic ester because there is a 5-carbon chain and a 2-carbon chain on either side of the ester group. As mentioned, the C7 to C12 aliphatic ester cosolvent can be included in the fusing agent from about 4 wt % to about 60 wt %, but may alternatively be included at from about 5 wt % to about 50 wt %, from about 10 wt % to about 40 wt %, or from about 15 wt % to about 35 wt %. The amount used may depend, in some instances, on the concentration of avobenzone to be included in the final fusing agent, or in the fluid composition prepared to dissolve the avobenzone prior to admixing with some of the other fusing agent formulation components.

In some examples, the C7 to C12 aliphatic ester cosolvent can be included with other organic cosolvent(s). Organic cosolvents that may be added include polyol, oligoglycol, lactam, C2 to C6 aliphatic alcohol, and/or the like. More specific examples include glycerol; diols such as 1,2 butanediol, 1,2-propanediol (also referred to as propylene glycol), 2,3-butanediol, 1,2-pentanediol, 2-methyl-2,4-pentanediol, 2-methyl-1,3-propanediol; triols such as glycerol; tetrahydrofuran; ethylene glycol dimethyl ether; ethylene glycol diethylene glycol; triethylene glycol; tripropylene glycol butyl ether; lactams; 2-pyrrolidone; 1-(2-hydroxyl)-2-pyrrolidone; and/or the like. More specifically, C2 to C6 aliphatic alcohols, e.g., ethanol, or straight or branched chain propanol, butanol, pentanol, and/or hexanol may be included to enhance bubble formation when used for thermal ejection from jetting architecture. In some more specific examples, C2 to C4 polyols, e.g., glycerol, propylene glycol, etc., and/or 2-phenoxy ethanol can be included.

Other components may also be included, such as surfactant, additive that inhibits growth of harmful microorganisms, pH adjuster, buffer, viscosity modifier, chelating or sequestering compound, preservative, emollient, etc. These other components may be included, if present, at from about 0.1 wt % to about 15 wt % of other liquid components based on a total weight of the fusing agent. In some examples, the fusing agent includes surfactant and/or emulsifier to promote a homogenous fluid if there may be phase separation that would otherwise occur.

If surfactant is included, the surfactant can be a non-ionic surfactant, a cationic surfactant, and/or an anionic surfactant. Example non-ionic surfactants can include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA), or an ethoxylated wetting agent and molecular defoamer (e.g., SURFYNOL® 420 from Air Products and Chemical Inc., USA). Still other examples of surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK), and dioctyl sulfosuccinate sodium salt. Example cationic surfactant can include dodecyltrimethylammonium chloride, hexadecyldimethylammonium chloride, or a combination thereof. In some examples, the surfactant can include a co-polymerizable surfactant. Co-polymerizable surfactants can include polyoxyethylene alkylphenyl ether ammonium sulfate, sodium polyoxyethylene alkylether sulfuric ester, polyoxyethylene styrenated phenyl ether ammonium sulfate, or mixtures thereof. In some examples, the surfactant (which may be a blend of multiple surfactants) may be present in the fusing agent at an amount ranging from about 0.01 wt % to about 5 wt %, from about 0.05 wt % to about 2 wt %, or from about 0.01 wt % to about 1 wt %.

Other example surfactants that can be added include sorbitan esters (Span surfactants), ethoxylated derivatives of sorbitan ester or polyoxyethylene derivatives of sorbitan esters (Tween surfactants), ethoxylated fatty alcohols (Laureth or Brij™ surfactants from Croda, USA), and/or amine ethoxylates, octylphenol ethoxylates, alkyl polyglucosides, dioctyl sulfosuccinates, phosphate esters (Triton™ surfactants from Dow, USA). In some examples, the surfactant used can include Laureth-23.

Example additives that can inhibit the growth of harmful microorganisms can include biocides, fungicides, and other antimicrobial agents. Example antimicrobial agents can include the NUOSEPT® (Ashland Inc., USA), VANCIDE® (R.T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T (Lonza Ltd. Corp., Switzerland), KORDEK® MLX (The Dow Chemical Co., USA), and a combination thereof. In an example, if included, a total amount of antimicrobial agents in the fusing agent can range from 0.01 wt % to 3 wt %.

A pH adjuster or buffer may be included. The pH adjuster can be any compound that raises or lowers the pH when added in relatively small amounts, e.g., about 0.01 wt % to about 1 wt %. An example pH adjuster that can be used is sodium bicarbonate. If a buffer is used, the buffer can be provided to withstand small changes (e.g., less than 1) in pH when small quantities of a water-soluble acid or a water-soluble base are added to a composition containing the buffer. The buffer can have a pH that can range from 5 to 9.5, from 7 to 9, or from 7.5 to 8.5. In some examples, the buffer can include a poly-hydroxy functional amine. In other examples, the buffer can include potassium hydroxide, 2-[4-(2-hydroxyethyl) piperazin-1-yl]ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer can include 2-amino-2-(hydroxymethyl)-1,3-propanediol (TRIZMA® sold by Sigma-Aldrich, USA), beta-alanine, betaine, or mixtures thereof.

Example formulations of a fusing agent can be prepared in accordance with Table 1, as follows:

TABLE 1

| Example Formulation | |
|---|---|
| Components | wt % |
| Avobenzone | 0.5-10 |
| C7 to C12 Aliphatic Ester Cosolvent | 4-60 |
| Additional Organic Cosolvent | 10-70 |
| Surfactant | 0.1-10 |
| Other Additives | 0-5 |
| DI Water | 5-40 |

Three-Dimensional Printing Kits

In other examples, a three-dimensional printing kit includes the fusing agent as outlined above, and a build material including from about 80 wt % to 100 wt % polymeric particles. In further detail regarding the build material, the polymeric particles can be present at from about 90 wt % to about 100 wt %, from about 95 wt % to about 100 wt %, from about 80 wt % to about 90 wt %, from about 85 wt % to about 95 wt %, or at about 100 wt %.

The polymeric particles 120 can be selected from polyacetal, polyacrylate, polyamide, polybutylene terephthalate, polycarbonate, polyester, polyether ketone, polyethylene terephthalate, polyethylene, polypropylene, polystyrene, thermoplastic polyamide elastomer, copolymers thereof, blends of any of the multiple polymers listed herein, as well as mixtures thereof. In one example, the polymeric particles can include a polyamide, and the polyamide can be selected from polyamide-6, polyamide-9, polyamide-11, polyamide- 12, polyamide-66, polyamide-612, or a combination thereof. In yet other examples, the polymeric particles can include a polyacrylate, polybutylene terephthalate, polycarbonate, polyester, polyethylene, polystyrene, copolymers thereof, blends of any of the multiple polymers listed herein, as well as mixtures thereof. Core shell polymer particles of these materials may also be used. In some examples, the build material can exclude amorphous materials.

In some examples, the polymeric particles (and other particles if present) of the build material can have a D50 particle size that can range from about 10 µm to about 150 µm. Polymeric particles can alternatively have a D50 particle size that can range from about 10 µm to about 100 µm, from about 20 µm to about 80 µm, from about 30 µm to about 50 µm, from about 25 µm to about 75 µm, from about 40 µm to about 80 µm, from about 50 µm to about 75 µm, from about 75 µm to about 150 µm, from about 60 µm to about 90 µm, or from about 100 µm to about 150 µm, for example.

The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter.

The shape of the particles of the build material can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting of the particles.

The polymeric particles in the build material can have a melting point that can range from about 75° C. to about 350° C., from about 100° C. to about 300° C., or from about 150° C. to about 250° C. As examples, the build material can be a polyamide having a melting point of about 170° C. to about 190° C. A variety of polyamides with melting points or softening points in these ranges can be used. In a specific example, the build material can include polyamide particles, such as polyamide-12, which can have a melting point from about 175° C. to about 200° C. In another example, polyamides such as thermoplastic polyamide elastomers can be used, which may have a melting point from about 135° C. to about 210° C. in some examples.

The build material may include, in addition to the polymeric particles, other particles such as filler particles, charging particles, flow aid particles, or a combination thereof. If included, the other particles can be present at from about 0.01 wt % to about 20 wt %, from about 0.1 wt % to about 10 wt %, or from about 0.2 wt % to about 5 wt %, based upon the total wt % of the build material.

Charging particles, for example, may be added to suppress tribo-charging. Examples of suitable charging particles include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America).

Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity). Examples of suitable flow aid particles include tricalcium phosphate (E341), powdered cellulose (E460 (ii), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, if added, the flow aid particles can be included in an amount ranging from greater than 0 wt % to about 20 wt %, from about 0.1 wt % to about 10 wt %, or from about 0.2 wt % to about 5 wt %, based upon the total wt % of the build material.

In some examples, the three-dimensional printing kits can include additional or secondary fluid agent(s), such as a detailing agent, a coloring agent, other fluid agents, or any combination of secondary fluid agents. The detailing agent, on the other hand, can include a detailing compound. The detailing compound can reduce a temperature of the build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water and/or an organic cosolvent that can evaporate at the temperature of the powder bed. In some cases, the powder bed can be preheated to a preheat temperature within about 10° C. to about 70° C. of the fusing temperature of the polymeric particles. Depending on the type of polymeric particles used, the preheat temperature can be in the range of about 90° C. to about 200° C. or higher. The detailing compound can be a solvent that can evaporate when it comes into contact with the powder bed at the preheat temperature, thereby cooling the printed portion of the powder bed through evaporative cooling.

In certain examples, the detailing agent can include water, cosolvents, or a combination thereof. In some examples, the detailing agent can be water, or can be mostly water. For example, the detailing agent can be from about 85 wt % to 100 wt %, or from about 85 wt % to about 99 wt % water. In other examples, the detailing agent can be from about 95 wt % to 100 wt %, or from about 95 wt % to about 99 wt % water.

In some examples, the detailing agent can include an organic cosolvent. The cosolvent can be as identified above in the description of the fusing agent. In another example, cosolvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-methoxy-3-methyl-1-butanol, isobutyl alcohol, 1,4-butanediol, N,N-dimethyl acetamide, and a combination thereof. The cosolvent may be present in the detailing agent at from about 1 wt % to about 15 wt %, at from about 5 wt % to about 10 wt %, at from about 1 wt % to about 10 wt %, or from about 5 wt % to about 15 wt %.

In still further examples, the detailing agent can be substantially devoid of solubilized avobenzone or other radiation absorbers. That is, in some examples, the detailing agent can be substantially devoid of ingredients that absorb enough radiation energy to cause particles of the build material to fuse or adhere to one another. In some examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead, e.g., piezo- or thermal-printhead. In some examples, the detailing agent can include jettability imparting ingredients such as those in the fusing agent described above. These ingredients can include water, surfactant, dispersant, cosolvent, biocides, viscosity modifiers, materials for pH adjustment, sequestering agents, preservatives, and so on. These ingredients can be included in any of the amounts described above.

The coloring agent, if present, can include an aqueous liquid vehicle and a colorant, such as a pigment and/or a dye. The aqueous liquid vehicle may be similar to liquid vehicles used for formulating aqueous ink compositions, the fusing agent described above, or the detailing agent described above. As the printed three-dimensional objects of the present disclosure can be white, transparent, or translucent after fusion, a coloring agent can be used with good success in providing color with good color gamut, or even multi-colored portions, to the three-dimensional object.

Figure 4:
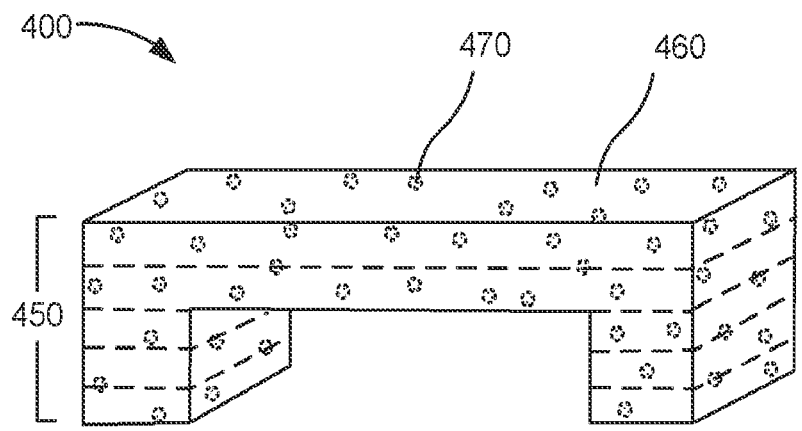
FIG. 4 schematically illustrates an example three-dimensional object in accordance with the present disclosure.

The three-dimensional printing kits can be used with three-dimensional printing systems 100 as shown in FIG. 1 to prepare three-dimensional objects 150 as shown by way of example in FIG. 4. Referring to FIG. 1 more specifically, the three-dimensional printing kit includes the fusing agent 110 and the build material 120 as previously described. The three-dimensional printing system is shown by way of example to illustrate fusing agents, three-dimensional printing kits, and methods of three-dimensional printing described hereinafter. In this example, a fluid applicator 115, a build platform 125, an electromagnetic energy source 130, and a supply/particle spreader 140 are shown. The fluid applicator can be fluidly coupled to or fluidly coupleable to the fusing agent to selectively and iteratively eject the fusing agent onto successively placed individual layers of the build material, and the electromagnetic energy source can be positioned or movable to expose the individual layers of the build material to radiation energy to selectively fuse the polymeric particles in contact with the solubilized avobenzone to form fused layers 150. The energy source can emit UV energy sufficient to cause the polymeric particles in contact with the fusing agent to fuse, while not causing fusion to build material that has not been contacted by the fusing agent. In some examples, the three-dimensional printing system can also further include one or more secondary fluid agents (not shown), but as described previously, e.g., coloring agent and/or a detailing agent.

The fluid applicator 115 can be any type of apparatus capable of selectively dispensing or applying a fluid agent. For example, the fluid applicator can be a fluid ejector or digital fluid ejector, such as an inkjet print head, e.g., a piezoelectric print head, a thermal print head, a continuous print head, etc. The fluid applicator could likewise be a sprayer, a dropper, or other similar structure for applying a fluid agent to the polymeric build material. Thus, in some examples, the application can be by jetting or ejecting from a digital fluid jet applicator, similar to an inkjet pen. In other examples, the fluid applicator 115 can be located on a carriage track, but could be supported by any of a number of structures. The fluid applicator may include a motor (not shown) and can be operable to move back and forth. The fluid applicator can also be moved front to back, for example, to provide both x-axis and y-axis movement over the build material when positioned over a powder bed of the build material 120. The build platform 125 supporting the powder bed can be positioned to receive the fusing agent 110 from the fluid applicator to be received on the build material. The build platform can be configured to drop in height (shown at "x"), thus allowing for successive layers of build material to be applied by a spreader 140. The build material can be layered in the build platform at a thickness that can range from about 5 µm to about 1 cm. In some examples, individual layers can have a relatively uniform thickness. In one example, a thickness of a layer of the particulate build material can range from about 10 µm to about 500 µm, from about 50 µm to about 500 µm, from about 80 µm to about 400 µm, from about 100 µm to about 350 µm, or from about 100 µm to about 300 µm.

The electromagnetic energy source 130 can be any energy source operable to emit ultraviolet energy having a wavelength that can range from 345 nm to about 415 nm, and typically may have a peak within this range, but could have a peak immediately adjacent to this range with enough shoulder electromagnetic radiation to cause the solubilized avobenzone to generate sufficient heat to selectively fuse the polymeric particles together to form the three-dimensional object. The electromagnetic energy source can be selected from a UV LED array, fluorescent lamp emitting UV, mercury vapor lamp, high energy gas discharge lamp, UV emitting laser or laser array. In one example, the electromagnetic energy source can be a UV LED array.

Methods of Making Fusing Agents

Figure 2:
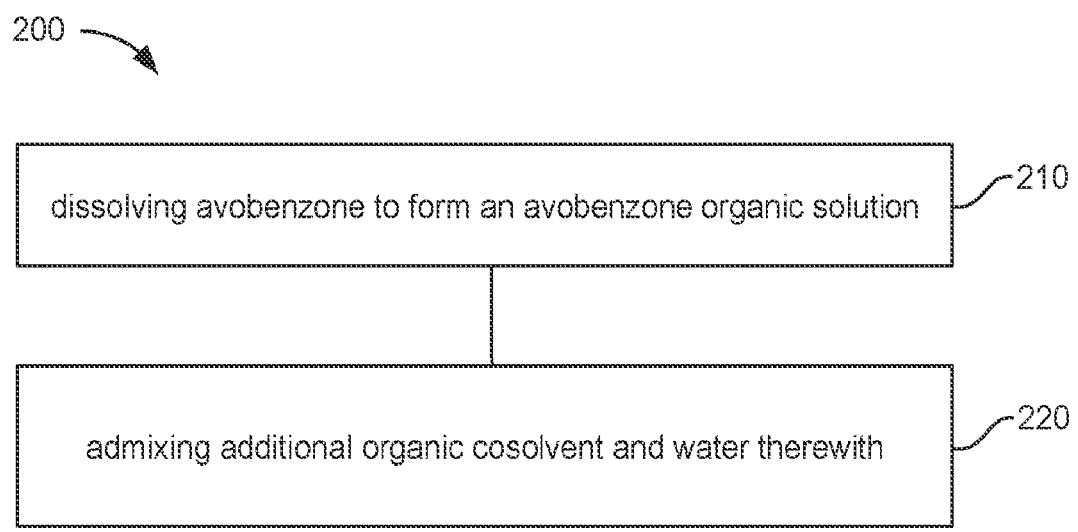
FIG. 2 is a flow chart illustrating example methods of preparing fusing agents in accordance with the present disclosure.

As illustrated in FIG. 2, a method 200 of making a fusing agent for three-dimensional printing includes dissolving avobenzone 210 to form an avobenzone organic solution, and admixing 220 additional organic cosolvent and water therewith. Dissolving the avobenzone includes dissolving in C7 to C12 aliphatic ester cosolvent at a weight ratio of about 1:8 to about 1:20, from about 1:10 to about 1:18, or from about 1:10 to about 1:16. Admixing additional organic cosolvent and water therewith results a fusing agent with about 0.5 wt % to about 10 wt % of solubilized avobenzone. In one example, admixing further includes admixing a surfactant therein. The surfactant can be added at any point in the process. Typically, the water is added last, either by itself or mixed with other organic components. Some organic cosolvents (other than the C7 to C12 aliphatic ester cosolvent) may be added prior to addition of the water or water/organic component mixture.

Methods of Three-Dimensional Printing

Figure 3:
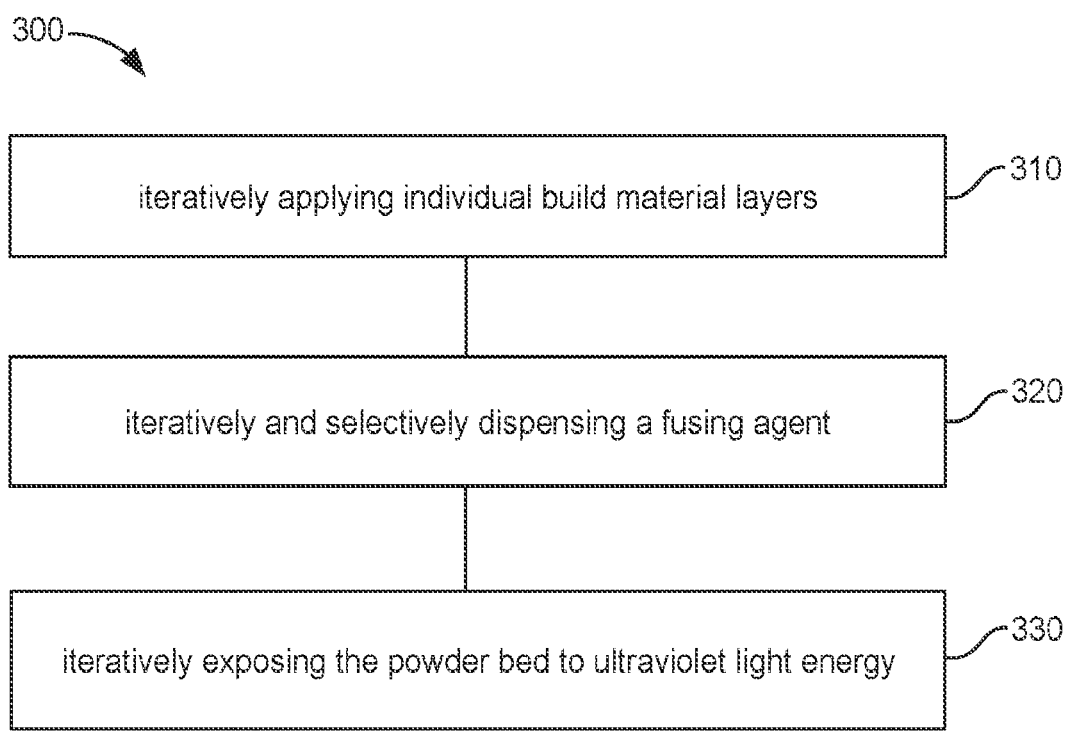
FIG. 3 is a flow chart illustrating example methods of three-dimensional printing in accordance with the present disclosure.

Referring now to FIG. 3, a method 300 of three-dimensional printing includes iteratively applying 310 individual build material layers of a polymer build material including from about 80 wt % to 100 wt % polymeric particles; and based on a three-dimensional object model, iteratively and selectively dispensing 320 a fusing agent onto the individual build material layers, wherein the fusing agent includes from about 0.5 wt % to about 10 wt % solubilized avobenzone. The method further includes iteratively exposing 330 the powder bed to ultraviolet light energy for a time duration of about 0.1 second to about 10 seconds to selectively fuse the polymeric particles in contact with the solubilized avobenzone at the individual build material layers resulting in a fused three-dimensional object. In one example, the polymeric particles can be white, and the fused three-dimensional object can be white, translucent, or transparent. In another example, the polymeric particles can be white, and based on the three-dimensional object model, the method can further include iteratively applying a coloring agent including a liquid vehicle and a colorant. This results in the fused three-dimensional object becoming colored by the coloring agent. The ultraviolet light energy applied includes light energy having a peak wavelength from about 345 nm to about 415 nm with shoulder light energy within the ultraviolet range.

Application of the fusing agent can be such that a sufficient amount of avobenzone radiation absorber is applied to respond to application of the light energy, thereby selectively fusing the polymeric particles in contact with the fusing agent. The concentration of solubilized avobenzone can be considered when determining how much fusing agent to apply. For example, a weight ratio of polymeric particles to solubilized avobenzone applied thereto can be from about 1000:1 to about 20:1. To illustrate, a weight ratio of 1000:1 can be achieved with lower levels of fusing agent deposition and lower concentrations of solubilized avobenzone in the fusing agent, e.g., at or near 0.5 wt % solubilized avobenzone. Conversely, the 20:1 weight ratio may represent a higher level of fusing agent deposition with a higher concentration of solubilized avobenzone in the fusing agent, e.g., at or near 10 wt % solubilized avobenzone. Other weight ratio ranges of (fused) polymeric particles to solubilized avobenzone found in the three-dimensional object can be from about 15:1 to about 800:1, from about 20:1 to about 500:1, from about 50:1 to about 350:1, or from about 100:1 to about 250:1, for example. Example levels (or contone) of fusing agent applied can be based on the content of solubilized avobenzone to achieve the weight ratios set forth above. In some examples, the polymeric particle to fusing agent weight ratio can be from about 1:1 to about 40:1, from about 1:1 to about 20:1, or from about 2:1 to about 10:1.

As mentioned, the fusing agent with solubilized avobenzone can provide radiation absorbing capability to receive electromagnetic radiation with a peak emission within the range of about 345 nm to about 415 nm, which causes the solubilized avobenzone to become heated, providing a sufficient temperature boost to cause the polymeric particles to become heat melted or fused. For example, by application of electromagnetic energy within one of these ranges at an energy level from about 2 W/cm$^2$ to about 40 W/cm$^2$ with an irradiation application time (or dwell time) from of about 0.1 second to about 10 seconds, the polymeric particles of the build material can be sufficiently heated to cause intra-layer heat fusion as well as inter-layer fusion (from layer to layer), such as by the melting together of particles and layers.

The solubilized avobenzone can provide a boosting capacity sufficient to increase the temperature of the build material above the melting or softening point of the polymeric particles therein. As used herein, "temperature boosting capacity" refers to the ability of solubilized avobenzone as a fusing compound to convert ultraviolet or violet electromagnetic energy, e.g., from about 345 nm to about 415 nm, into thermal energy to increase the temperature of the polymeric particles of the build material over and above the temperature of the unprinted portion of the build material. Typically, the build material can be fused together when the temperature increases to or above the melting or softening temperature of a polymer of the polymeric particles, but fusion can also occur in some instances below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the polymeric particles in contact with the solubilized avobenzone can coalesce to form a layer of a three-dimensional part while the remaining polymeric particles can remain loose.

As used herein, "peak absorption" indicates that from about 20% to about 100% of light emitted at a specified wavelength range is absorbed by the solubilized avobenzone. In other examples, at least about 50%, at least about 70%, at least about 80%, at least about 90%, at least about 95%, or 100% of the light emitted at the wavelengths emitted by an energy source can be absorbed by the solubilized avobenzone. The solubilized avobenzone can exhibit absorption at other wavelengths outside of this range, but the solubilized avobenzone will exhibit at least one absorption peak of from about 50% to 100% absorption within the range of about 345 nm to about 415 nm, and the absorption is sufficient to cause the polymeric particles of the build material to become intra-layer and inter-layer heat-fused to form a multi-layered three-dimensional object. In further detail, when fusing the build material, a certain minimum amount of radiation (J/cm$^2$/sec) can be used to cause fusing. Whether that amount comes from 20% or 80% or 100% of the incoming radiation that is absorbed (e.g., such as from inherent material absorption subtracting reflection, etc.), as long as there is enough radiation used, fusing can occur. The term "fuse" or "fusing" when referring to the build material indicates that polymeric particles are fully or partially melted together so that that they become joined, and thus upon cooling, the three-dimensional objects formed are in the form of a monolithic mass polymer (whether the particles were fully melted or partially melted and joined at their surfaces). Furthermore, as solubilized avobenzone is used as the fusing compound in the fusing agent, the avobenzone becomes carried within the monolithic mass of the three-dimensional object in accordance with examples of the present disclosure. The term "fusing agent" should not be confused with a description of "fusing" of the polymeric particles. For example, the fusing agent containing solubilized avobenzone is used to absorb electromagnetic energy and convert that energy to heat so that at locations where it is applied to layers of the build material, the polymer particles can become fused, e.g., melted, together.

As used herein, "absorbance" indicates the capacity of the solubilized avobenzone to absorb light, and can be measured using a UV-visible spectrophotometer such as Cary 5000 spectrometer, for example. In some examples, the solubilized avobenzone can have an absorbance greater than about 0.2, e.g., from about 0.2 to about 2, from about 0.2 to about 1, from about 0.4 to about 1, or from about 0.2 to about 0.8.

This range can depend on the solubilized avobenzone (or absorber) concentration in the fusing agent. To illustrate, at a concentration of 0.5 wt % to 10 wt % solubilized avobenzone in the fusing agent, a 0.2 to 0.8 absorbance represents an absorbance range that can be reasonably achieved based on about 60% reflected energy to 12% reflected energy, resulting in enough heat to heat-fuse polymeric particles of the build material.

When applied to a layer of the build material, the aqueous liquid vehicle can be capable of wetting the build material and the solubilized avobenzone can be capable of penetrating into microscopic pores of the layer, e.g. the spaces between the polymeric particles of the build material. The solubilized avobenzone can be activated by heating using exposure to electromagnetic radiation, including UV electromagnetic radiation. When activated, the fusing agent can form a continuous network of polymer, melting the polymeric particles of the build material together to form a three-dimensional object or a printed layer of the three-dimensional object.

In some examples, the method can further include holding the build material at an elevated temperature less than the melting temperature of the polymeric particles to remove volatile fusing agent components applied thereon during printing. Heat can be applied to the build material to bring the build material to a temperature near its fusing temperature, making it easier to bring up a temperature enough to generate fusion of the build material. For example, heat may be applied to the build material in the powder bed from the build platform, from above, or to the polymeric build material prior to being spread on the powder bed to preheat the polymeric build material within about 10° C. to about 70° C. of a fusing temperature of the polymeric particles so that less energy may be applied to bring the polymeric particles to their fusing temperature.

In other examples, the method can further include iteratively applying a secondary fluid agent to individual build material layers. The secondary fluid agent can be selected from a coloring agent that includes a liquid vehicle and a colorant (to impart color to the three-dimensional object), a detailing agent that includes a detailing compound that reduces a temperature of the build material onto which the detailing agent is applied, a plasticizing agent, a porosity-promoting agent, etc. The detailing agent, for example, can be used by dispensing onto individual layers laterally at a border between a first area of the build material contacted by the fusing agent and an area of the build material uncontacted by the fusing agent. Printing a detailing agent laterally at a border can increase the definition of the three-dimensional object at the lateral edge and can permit a formation of a smooth edge at the printed three-dimensional object.

Three-Dimensional Objects

In accordance with examples herein, the three-dimensional printing kits and methods can be used to iteratively form three-dimensional objects, as shown at 400 in FIG. 4. An example three-dimensional object includes multiple fused polymeric layers 450 that were iteratively formed until the three-dimensional object was formed. More specifically, the multiple fused polymeric layers are in the form of a composite of fused polymer 460 (provided by heat fusion of the polymeric particles) and residual avobenzone 470 dispersed therein at a weight ratio from about 1000:1 to about 20:1. As an example, in the three-dimensional object, a weight ratio of 1000:1 can be achieved with lower fusing agent depositions (lower contone application) and lower concentrations of solubilized avobenzone in the fusing agent, based on the concentration and contone ranges provided previously. Conversely, the 20:1 weight ratio may represent a higher fusing agent deposition (higher contone application) with a higher concentration of solubilized avobenzone in the fusing agent, also based on the concentration and contone ranges provided previously. Other weight ratio ranges of (fused) polymeric particles to solubilized avobenzone found in the three-dimensional object can be from about 15:1 to about 800:1, from about 20:1 to about 500:1, from about 50:1 to about 350:1, or from about 100:1 to about 250:1, for example.

Definitions

It is noted that, as used in this specification and the appended claims, the singular forms "a," "an," and "the" include plural referents unless the context clearly dictates otherwise.

As used herein, "liquid vehicle" or "aqueous liquid vehicle" refers to water and in some examples, other components, such as, surfactants, solvents, cosolvents, anti-kogation agents, buffers, biocides, sequestering agents, viscosity modifiers, surface-active agents, and the like.

As used herein, "jetting" or "jettable" refers to compositions that are ejectable from jetting architecture, such as ink-jet architecture. Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc. Jetting is one methodology of applying fusing agent or other fluid agents to a build material in accordance with the present disclosure.

As used herein, "kit" can be synonymous with and understood to include a plurality of compositions including one or more components where the different compositions can be separately contained in one or more containers prior to and during use, e.g., building a three-dimensional object, but these components can be combined together during a build process. The containers can be any type of a vessel, box, or receptacle made of any material.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also the individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates examples of the present disclosure. However, it is to be understood that the following are illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Fusing Agent

A fusing agent formulation was prepared in accordance with Table 2 below:

TABLE 2

Fusing Agent

| Components | Category | wt % |
|---|---|---|
| Avobenzone | Radiation Absorber | 2.5 |
| Octyl Acetate | C7 to C12 Solubilizing Organic Cosolvent | 30 |
| Diethylene Glycol Ethyl Ether | Organic Cosolvent | 36.5 |
| C2-C6 Aliphatic Alcohols | Organic Cosolvent | 15 |
| C2-C4 Polyols | Organic Cosolvent | 3.75 |
| 2-Phenoxy Ethanol | Organic Cosolvent | 0.138 |
| Laureth-23 | Emulsifier/Surfactant | 1 |
| Chelator, pH Adjuster, Emollient | Other Additives | 0.003 |
| DI water | Solvent | 11.082 |

The fusing agent shown in Table 2 (or "Fusing Agent") was the formulation prepared after mixing all of the components together. However, the mixing of components occurred in three stages. A first stage of mixing occurred by mixing the avobenzone and the octyl acetate together at about a 1:12 weight ratio to dissolve the avobenzone. A second stage of mixing occurred by mixing the first stage mixture with diethylene glycol ethyl ether and the C2-C6 aliphatic alcohols. Last, a third stage of mixing occurred by mixing the balance of the components into the second stage mixture.

The Fusing Agent was confirmed to be a homogenous solubilized formulation that did not undergo flocculation or sedimentation, as the avobenzone was fully dissolved. Furthermore, the Fusing Agent was tested for jettability by dispensing the formulations as bars printed onto a paper medium using an HP® ink jet printer. The Fusing Agent did not exhibit any significant negative effects on decap or nozzle health of the print head.

Example 2—Preparation of Three-Dimensional Objects

In order to test the fusing capability of the Fusing Agent prepared in accordance with Example 1, as well as whether the fusing agent would retain the white color of the build material, the Fusing Agent (2.5 wt % solubilized avobenzone), and sample multi-layered three-dimensional objects were prepared using the Fusing agent and two different types of polymeric particles were used as the build material, namely polyamide-12 (PA-12) and thermoplastic polyamide elastomer (TPA). The build material was heated to 160° C. for PA-12 and to 120° C. for TPA. Thus, the build materials were brought to an elevated temperature within about 30° C. of the fusing temperature. The Fusing Agent was then selectively applied to portions of the build material that corresponded with a layer, e.g., 80 µm or 100 µm, of the three-dimensional object shape at a 128 contone (2 drops/pixel), which corresponds to a fusing agent to polymeric build material weight ratio of about 1:99. This was repeated in a layer-by-layer manner until three-dimensional objects were formed. The UV radiation applied originated from an UV-LED source having peak absorption at 365 nm and FWHM (full width at half max of the Gaussian-like emission spectrum) and a power level of 10 W/cm$^2$, and a dwell time of about 0.5 seconds). The three-dimensional objects formed were tubular lattice structures having a tube length of about 8 cm, a cross-sectional diameter of about 2 cm, and individual lattice structure thicknesses of about 1 mm. For both the PA-12 and the TPA, the resultant fused three-dimensional object formed without melting of the surrounding polymer powders that were not contacted with the Fusing Agent. At 365 nm, there would typically be minimal if any powder degradation that would occur, for example. It is also understood that this process can be repeated with more or even less avobenzone content being present in the final three-dimensional object.

All of the parts prepared retained their white/translucent appearance. Because of the white/translucent appearance of the three-dimensional object, by applying a coloring agent containing a pigment and/or dye, color can be imparted to the object with good color gamut, either by applying a coloring agent separately, or by adding a colorant to the Fusing Agent.

While the present technology has been described with reference to certain examples, it is appreciated that various modifications, changes, omissions, and substitutions can be made without departing from the spirit of the disclosure. It is intended, therefore, that the disclosure be limited by the scope of the following claims.

What is claimed is:

1. A fusing agent for three-dimensional printing, comprising:
   from about 5 wt % to about 40 wt % water;
   from about 4 wt % to about 60 wt % C7 to C12 aliphatic ester cosolvent; and
   from about 0.5 wt % to about 10 wt % solubilized avobenzone.

2. The fusing agent of claim 1, wherein the fusing agent has a peak absorption from about 345 nm to about 415 nm, and wherein the fusing agent has an absorbance from about 0.2 to about 2 at the peak absorption.

3. The fusing agent of claim 1, including from about 65 wt % to about 92 wt % organic cosolvent which includes the C7 to C12 aliphatic ester cosolvent.

4. The fusing agent of claim 1, wherein the C7 to C12 aliphatic ester cosolvent includes ethyl hexanoate, octyl acetate, ethyl octanoate, decyl acetate, ethyl decanoate, or a combination thereof.

5. A three-dimensional printing kit, comprising:
   the fusing agent of claim 1; and
   a build material including from about 80 wt % to 100 wt % polymeric particles.

6. The three-dimensional printing kit of claim 5, wherein the polymeric particles are white, have a D50 particle size from about 10 μm to about 150 μm, and are selected from polyacetals, polyacrylates, polybutylene terephthalates, polycarbonates, polyesters, polyether ketones, polyethylene terephthalates, polyethylenes, polypropylenes, polystyrenes, polyamides, thermoplastic polyamide elastomers, a copolymer thereof, or a mixture thereof.

7. The three-dimensional printing kit of claim 5, further comprising a secondary fluid agent, the secondary fluid agent including coloring agent comprising a liquid vehicle and a colorant, a detailing agent comprising a detailing compound that reduces a temperature of the build material onto which the detailing agent is applied, a plasticizing agent, a pore-promoting agent, or a combination of secondary fluid agents thereof.

8. A method of making a fusing agent for three-dimensional printing, comprising:
dissolving avobenzone in C7 to C12 aliphatic ester cosolvent at a weight ratio of about 1:8 to about 1:20 to form an avobenzone organic solution; and
admixing additional organic cosolvent and water with the avobenzone organic solution to form a fusing agent, wherein the fusing agent includes from about 0.5 wt % to about 10 wt % of solubilized avobenzone.

9. The method of claim 8, wherein admixing further includes admixing surfactant therein.

10. The method of claim 8, wherein some or all of the additional organic cosolvent is added to the avobenzone organic solution prior to the addition of the water.

11. A method of three-dimensional printing, comprising:
iteratively applying individual build material layers of a polymer build material including from about 80 wt % to 100 wt % polymeric particles;
based on a three-dimensional object model, iteratively and selectively dispensing a fusing agent onto the individual build material layers, wherein the fusing agent includes from about 0.5 wt % to about 10 wt % solubilized avobenzone; and
iteratively exposing the powder bed to ultraviolet light energy for a time duration of about 0.1 second to about 10 seconds to selectively fuse the polymeric particles in contact with the solubilized avobenzone at the individual build material layers resulting in a fused three-dimensional object.

12. The method of claim 11, wherein the polymeric particles are white, and wherein the fused three-dimensional object is white, translucent, or transparent.

13. The method of claim 11, wherein the polymeric particles are white, wherein based on the three-dimensional object model, the method further includes iteratively applying a coloring agent comprising a liquid vehicle and a colorant, and wherein the fused three-dimensional object is colored by the coloring agent.

14. The method of claim 11, wherein the ultraviolet light energy includes light energy with a peak wavelength from about 345 nm to about 415 nm with shoulder light energy within the ultraviolet range.

15. A fused three-dimensional object prepared by the method of claim 11, comprising multiple fused polymeric layers that are fused to one another, wherein individual fused polymeric layers include a composite of fused polymer of the polymeric particles and residual avobenzone dispersed therein at a weight ratio from about 1000:1 to about 20:1.

* * * * *